United States Patent [19]

Yamamoto et al.

[11] Patent Number: 5,251,145

[45] Date of Patent: Oct. 5, 1993

[54] DECISION APPARATUS FOR MACHINING STEPS OF NUMERICAL CONTROL INFORMATION GENERATING FUNCTION

[75] Inventors: Kyoichi Yamamoto; Kenji Ito, both of Niwa, Japan

[73] Assignee: Okuma Corporation, Aichi, Japan

[21] Appl. No.: 683,604

[22] Filed: Apr. 10, 1991

[30] Foreign Application Priority Data

Apr. 13, 1990 [JP] Japan .................................. 2-98249

[51] Int. Cl.⁵ .............................................. G06F 15/46
[52] U.S. Cl. ................................ 364/474.22; 364/191; 364/474.25
[58] Field of Search ...................... 364/474.15, 474.22, 364/474.25, 191, 474.23, 474.24; 318/568.1

[56] References Cited

U.S. PATENT DOCUMENTS

| | | | |
|---|---|---|---|
| 4,445,182 | 4/1984 | Morita et al. | 364/474.25 |
| 4,723,203 | 2/1988 | Kishi et al. | 364/191 |
| 5,043,865 | 8/1991 | Seki et al. | 364/474.22 |
| 5,099,432 | 3/1992 | Fukaya et al. | 364/474.25 |
| 5,107,413 | 4/1992 | Fukaya et al. | 364/474.15 |

Primary Examiner—Jerry Smith
Assistant Examiner—Brian C. Oakes
Attorney, Agent, or Firm—Wenderoth, Lind & Ponack

[57] ABSTRACT

A numerical control information generating system allows an operator to revise using a simple input method any of the types of machining steps, tools to be used and scopes of machining of a machining process which have previously been automatically decided according to certain criteria. Once a part shape and blank shape have been inputted, the system can fully utilize the knowhow of the operator without being restricted by detailed data of the shapes.

8 Claims, 19 Drawing Sheets

DECISION APPARATUS FOR MACHINING STEPS OF NUMERICAL CONTROL INFORMATION GENERATING FUNCTION

BACKGROUND OF THE INVENTION

1. Field of the Invention

This invention relates to an apparatus for determining machining steps and a numerical control apparatus having a numerical control information generating function which generates information for numerical control prior to machining, and more particularly, to an apparatus which automatically revises the types of machining steps, the tools to be used and the scope of a machining process, which have been automatically determined previously, according to operator preferences.

2. Description of the Prior Art

Numerical control information generating functions have been put into practice which generate numerical control information such as NC (numerical control) programs from design drawings using a graphic display screen and from the inputting of necessary data through man-machine dialogue. An operator can input a machining shape simply by pressing keys on a keyboard which correspond to the shape of a part depicted in the design drawings. Such functions are also capable of graphically displaying reference information useful for setting data for each operation and for inputting various data such as dimensions in response to queries made using ordinary language. As soon as the necessary data have been inputted for the numerical control information generation, a blank shape and a part shape will be displayed on the screen instantly, automatic calculation of the numerical control data will be started, and tool paths will be graphically displayed to generate numerical control information.

The above mentioned function generally includes the following steps (a) through (j).

(a) a step to select blank material
(b) a step to select graphic mode
(c) a step to input a blank shape and its dimensions
(d) a step to input a machined shape and its dimensions
(e) a step to input machine original points and of a tool rest position
(f) a step to select the type of steps
(g) a step to select tools
(h) a step to decide the scope of machining
(i) a step to input cutting conditions
(j) a step to calculate tool path Necessary data are sequentially inputted to eventually generate numerical control information.

In the numerical control information generating system like the one mentioned above, after the blank shape and part shape have been inputted, an operator judges and decides which region of the blank will be machined by which type of machining steps, and in which direction a tool should be moved as well as the order of machining steps. The data are inputted in the order decided by the operator.

The prior art method is quite flexible as it allows an operator to freely set the order of the machining steps or the scope of machining, but it requires a skilled operator to do so. Unskilled operators cannot quite manage the process of setting those data and find such work to be very cumbersome. The conventional method is problematic further in that the inputting operation takes much time because the name of a step is first selected, the order of the steps is decided, and then the tools, the cutting direction, the scope of machining and the cutting conditions for each step are inputted.

In order to overcome those defects, there has been proposed an apparatus having a function which automatically decides the types of steps, the order of steps and the scope of machining based on the input blank shape, part shape and their dimensions. However, the step types and the machining scopes depend considerably on the knowhow of the particular operator and the tools to be used. If the data are automatically selected according to a uniform rule, they may not quite satisfy the requirements of the operator, and the operator more often than not will want to revise the step types, the tools to be used, and the scope of machining. Then, the dimensions have to be inputted again. This proposed apparatus could not quite solve the conventional problems nor eliminate troublesome steps.

SUMMARY OF THE INVENTION

This invention was conceived to eliminate such defects encountered in the prior art and aims at providing a numerical control information generating system which can revise the step types, tools to be used and scopes of machining, which have automatically been determined according to a certain rule, using a simple input method if it is necessary to revise any of those input data as judged by an operator.

According to one aspect of this invention, for achieving the objects described above, there is provided an apparatus for automatically determining machining steps of a numerical control information generating function of the type where the shape of a blank to be machined and of a part are inputted and numerical control information is generated based on the above input shapes, which comprises an automatic decision means which automatically decides the types of steps, tools to be used and machining scopes based on a predetermined primary rule, a designation means which designates the items of revision which an operator wishes with respect to the above mentioned types of steps, tool to be used and machining scopes automatically decided based on the primary rule, an extraction means which extracts the thus designated types of steps, tools to be used and machining scopes, and an automatic revision means which automatically revises only the extracted step types, tools to be used and machining scopes according to a secondary rule which the operator prefers over the primary rule.

The nature, principle and utility of the invention will become more apparent from the following detailed description when read in conjunction with the accompanying drawings.

DESCRIPTION OF THE PREFERRED EMBODIMENTS

Figure 1:
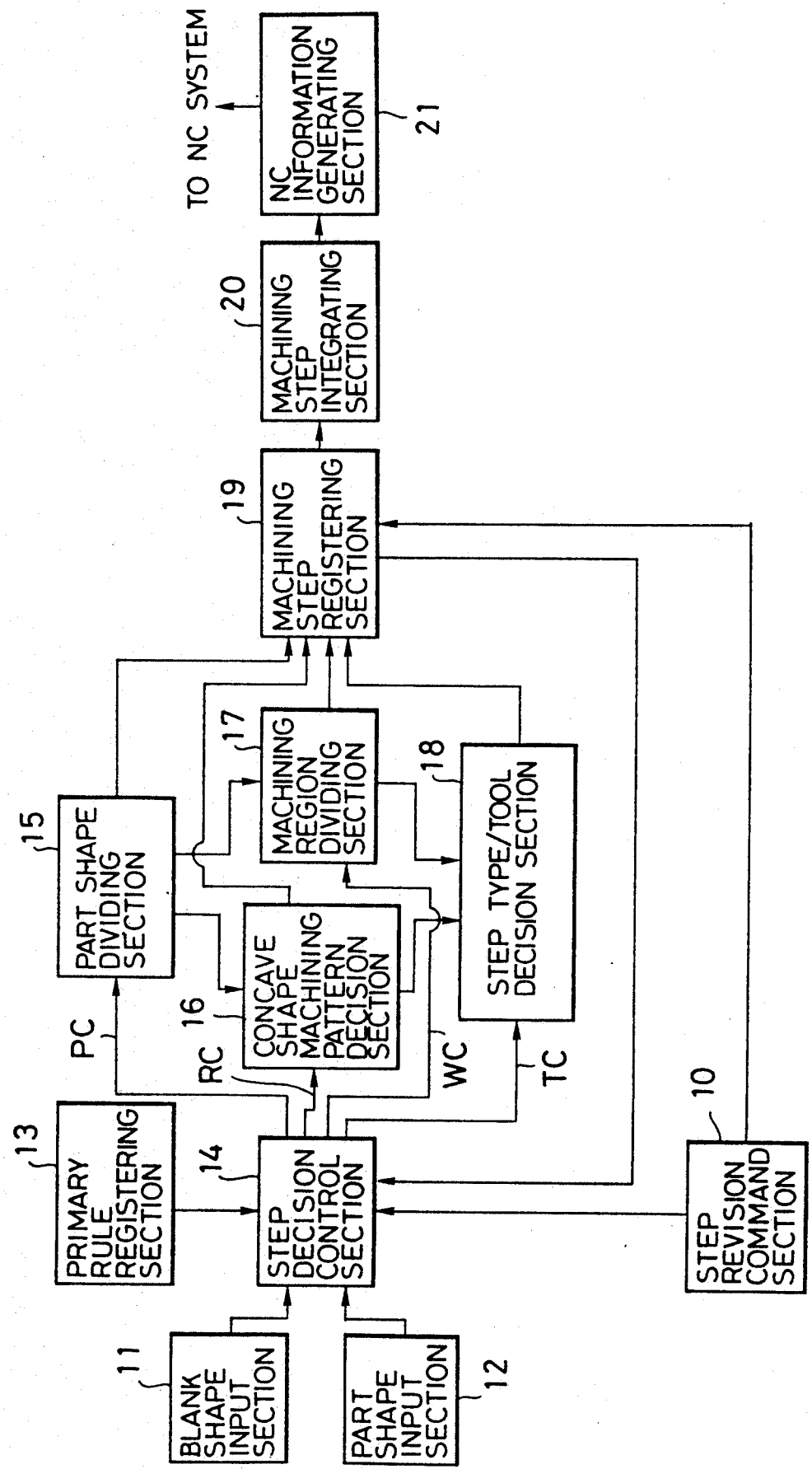
FIG. 1 is a block diagram showing an embodiment of this invention.

Referring to FIG. 1, this invention will now be described by way of an embodiment thereof. A blank shape and a part shape are respectively inputted by a blank shape input section 11 and a part shape input section 12 into a step decision control section 14. The step decision control section 14 is connected to a primary rule registering section 13 and a step revision command section 10. The step decision control section 14 controls a part shape dividing section 15, a concave (recessed) shape machining pattern decision section 16, a machining region dividing section 17 and a step type/tool decision section 18 according to respective commands. The respective outputs of the sections 15 through 18 are inputted to a machining step registering section 19 for registration. The output of the machining step registering section 19 is applied to a machining step integration section 20, which has its output applied to a numerical control information generating section 21. Thus generated information for numerical control is sent to an NC system.

The operation of the system with the above mentioned structure will be explained referring to the flow chart shown in FIGS. 2A and 2B.

Figure 3:
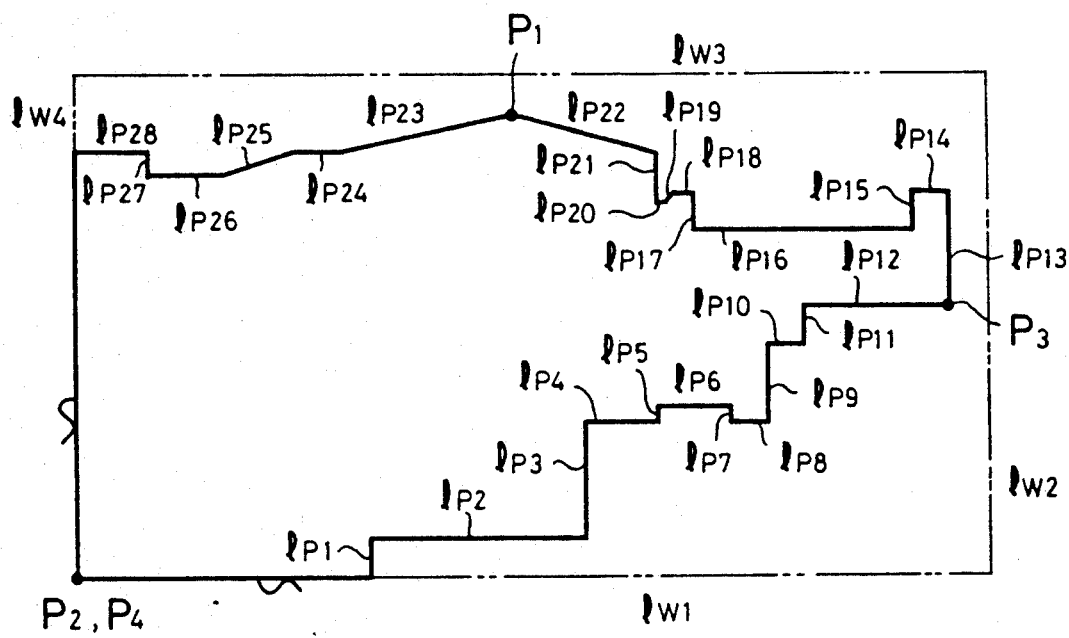
FIG. 3 is a view showing an example of input part and blank shapes.

While watching and confirming the input data on a display unit (not shown), an operator inputs a blank shape and a part shape from the blank shape input section 11 and the part shape input section 12. The part shape is decomposed into shape element lines, which will be described below. Referring to FIG. 3, the part shape comprises part shape element lines $l_{p1}$, $l_{p2}$, ..., $l_{p28}$. Each element line comprises position and dimension data which are sufficient to specify graphics of the part shape. Blank shape element lines $l_{w1}$, $l_{w2}$, ..., $l_{w4}$ are also specific.

The step decision control section 14 automatically decides the type of steps and the scopes of machining for the part based on the input blank shape and part shape and a primary rule registered at the primary rule registering section 13. The following Steps S1 through S14 are executed in accordance with the part shape dividing command PC, machining region dividing command WC, recessed shape machining pattern decision command RC and step type/tool decision command TC outputted from the step decision control section 14.

First, in accordance with the part shape dividing command PC, the part shape dividing section 15 classifies the part shape elements into those in the forward direction and those in the backward direction (Step S1). It is assumed that out of a group of points which have the maximum and minimum X-coordinates of the part shape elements, the ones having the minimum Z-coordinates are the dividing points (referred to herein as a forward/backward dividing points) between the forward and backward directions. The points P1 and P2 in FIG. 3 fall under such a category, and the shape element lines $l_{p1}$ through $l_{p22}$ are in the forward direction and shape element lines $l_{p23}$ through $l_{p28}$ in the backward direction. The part shape dividing section 15 then classifies the part shape element lines into those of outer diameter and those of inner diameter based on the part shape dividing command PC (Step S2). Out of a group of points having the maximum and minimum Z-coordinates of the part shape element lines, if dividing points (referred to herein as an outer/inner diameter dividing points) between the inner and outer diameters are set at the ones having the minimum X-coordinates, the points P3 and P4 in FIG. 3 will fall under such a category and the shape element lines $l_{p13}$ through $l_{p28}$ are the outer diameter and the shape element lines $l_{p1}$ through $l_{p12}$ the inner diameter. Then, in accordance with the part shape dividing command PC, the part shape dividing section 15 divides the part shape element lines into those outside and those inside of a recessed shape (Step S3). A recessed shape is an area which requires, during machining in the forward/backward directions, downward machining on the side of the outer diameter and upward machining on the side of the inner diameter. In FIG. 3, the recessed shapes include shape element lines $l_{p5}$ through $l_{p7}$, $l_{p15}$ through $l_{p17}$, $l_{p19}$ through $l_{p21}$ (the line $l_{p21}$ partially falls in the category), and $l_{p25}$ through $l_{p27}$. In accordance with the part shape dividing command PC, the part shape dividing section 15 classifies the part shape elements into face element lines and longitudinal element lines (Step S4). The face element line are those having an angle of less than 20 degrees against the X-axis and existing outside of the recessed shape while the longitudinal element lines are those other than the face element lines existing outside of the recessed shape. In FIG. 3, the shape element lines $l_{p1}$, $l_{p3}$, $l_{p9}$, $l_{p11}$, $l_{p13}$ and $l_{p21}$ (partially) fall under the category of the face element lines.

Based on the result of the aforementioned classification of the part shape element lines, a machining region is divided into machining scopes for each part shape element group. A machining region means a scope which is circumscribed by the blank shape element lines and the part shape element lines plus finish stocks for sufficient machining, and a scope which is circumscribed by part shape element lines plus finish stocks and the part shape element lines for finish machining. A set of plural machining scopes may be called as a machining region for both cases.

Figure 4:
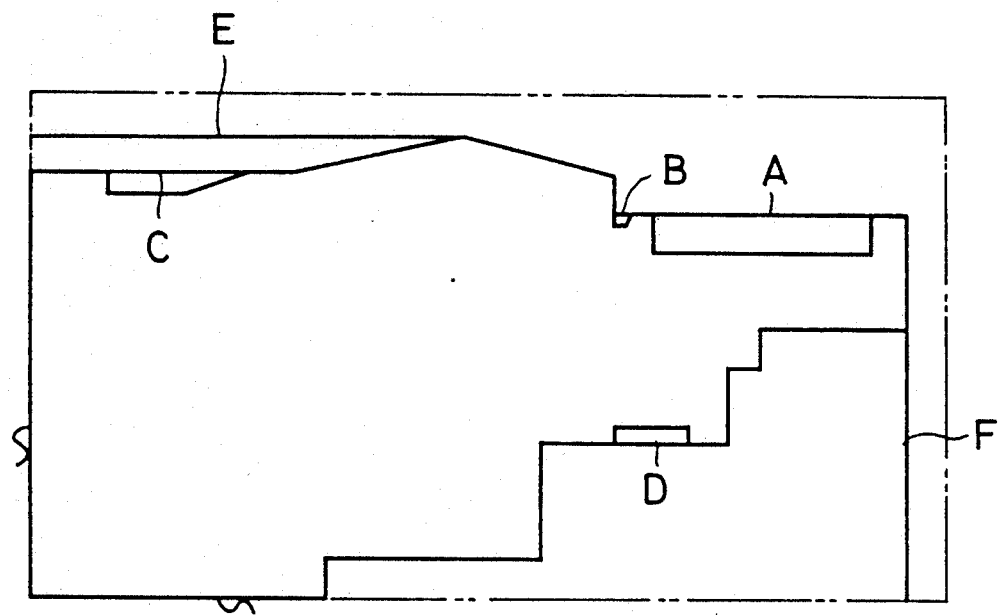
FIG. 4 is a view showing examples of the forward/backward direction, outer/inner diameter, inside/outside of a recessed shape.
Figures 5A, 5B:
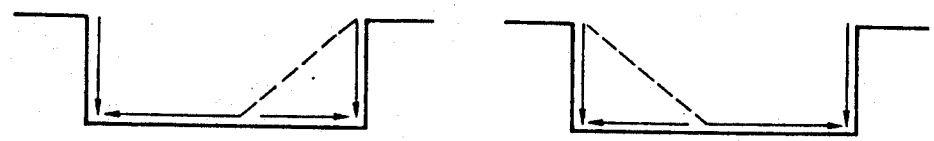
FIGS. 5A through 5N are views showing examples of the machining pattern menu for the inside of a recessed shape for rough machining, respectively.
Figures 5B, 5D:
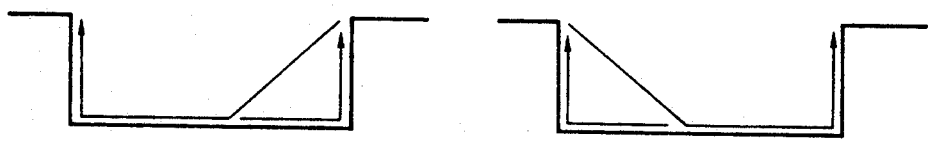
Figures 5E, 5F:
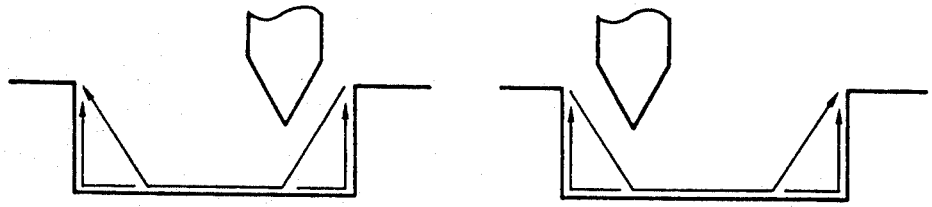
Figures 5G, 5H:
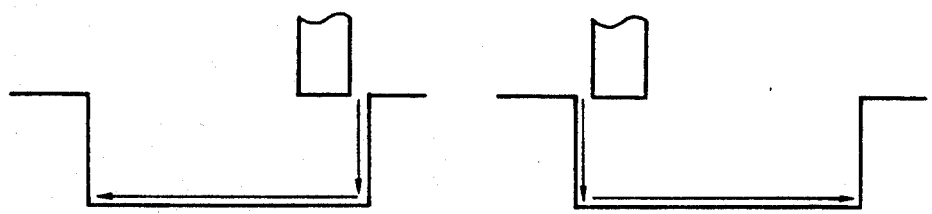
Figures 5I, 5J:
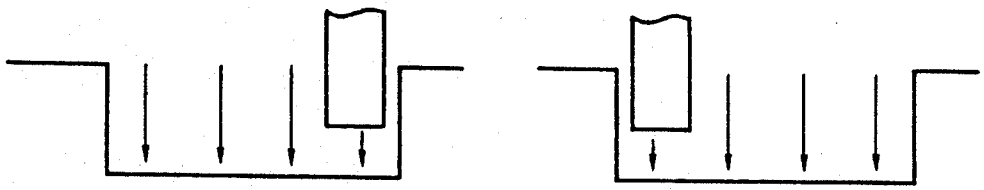
Figures 5K, 5L:
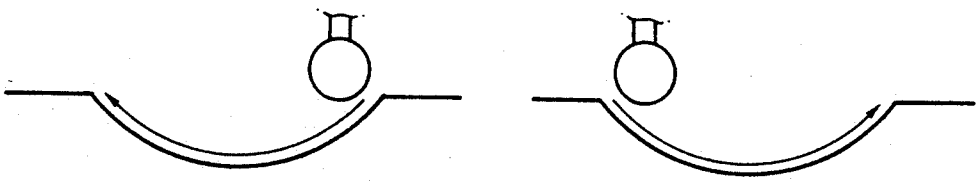
Figures 5M, 5N:
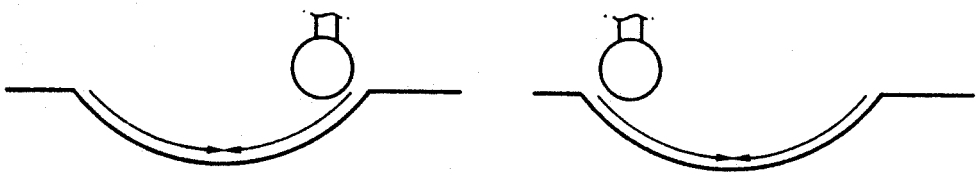
Figure 6A:
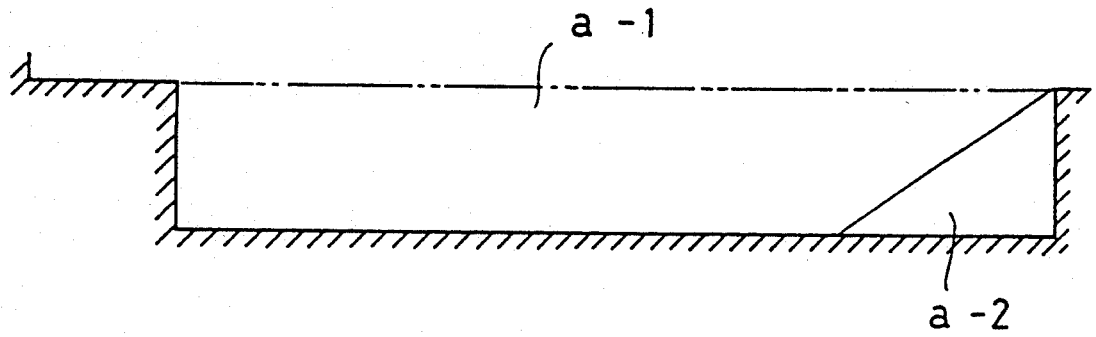
FIGS. 6A through 6D are views showing an example of rough machining inside of a recessed shape according to the primary rule, respectively.
Figure 6C:
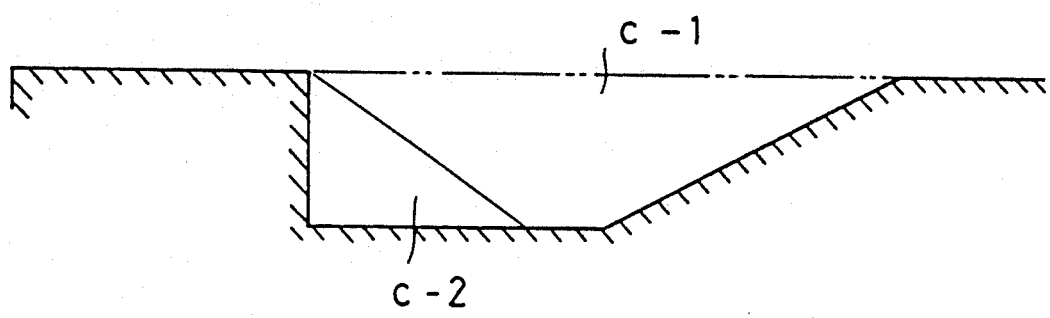
Figure 6B:
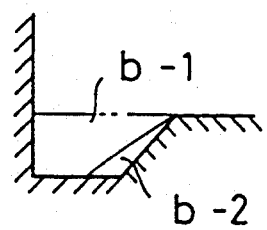
Figure 6D:
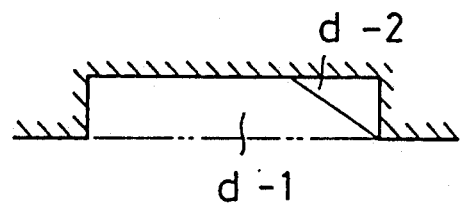

In accordance with a recessed shape machining pattern decision command RC, the decision section 16 automatically decides a rough machining pattern within the recessed shape (Step S5). More specifically, a method for machining the part inside of the boundaries A through D in FIG. 4 is automatically selected from the menu as shown in FIGS. 5A through 5N. For this particular case, FIG. 5C is selected for the forward direction and FIG. 5D is selected for the backward direction. If the recessed shapes are coded as (a) through (d), the machining scopes within each recessed shape will be as shown in FIGS. 6A through 6D.

Figure 7:
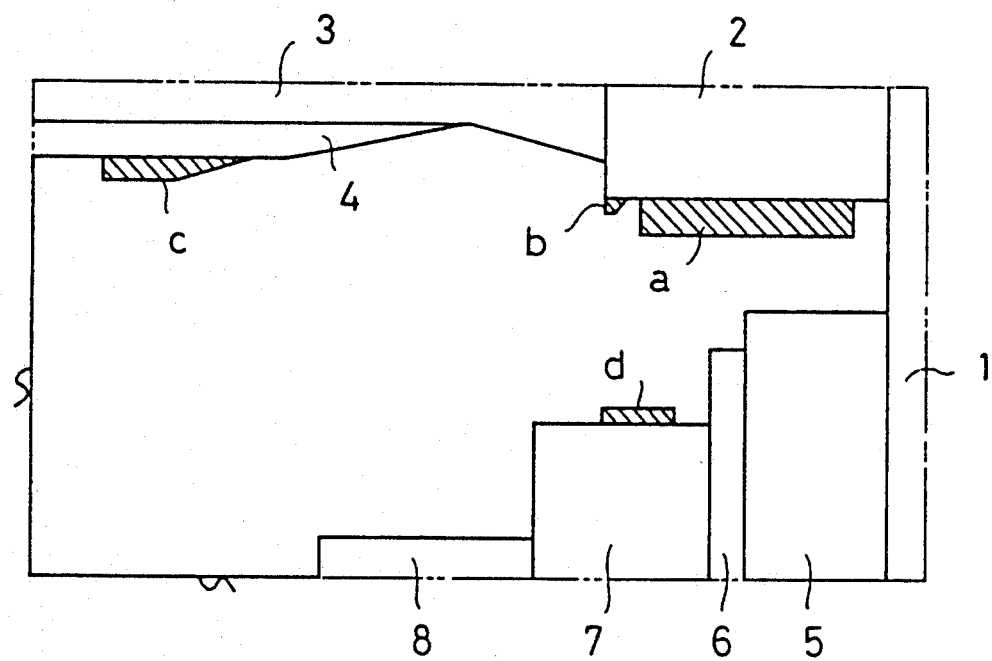
FIG. 7 is a view showing an example of dividing a rough machining region outside of a recessed shape.

Then, scopes for rough machining outside of the recessed shape will be automatically decided. With a machining region dividing command WC from the step decision control section 14, a region is divided by the machining region dividing section 17 into categories of the forward/backward directions and the outer/inner diameters (Steps S6 and S7). In other words, the region is divided with line segments each of which is an extension from the dividing point of the forward/backward directions to a blank shape element in the negative direction on the Z-axis and line segments each of which is an extension from the dividing point of outer and inner diameters to a blank shape element in the negative direction on the X-axis. The boundaries E and F in FIG. 4 are the dividing lines. The machining region which has been divided so far is divided along the face element lines by the machining region dividing section 17 based on the machining region dividing command WC (Step S8). This is to further segment a machining scope and decide the step types in more detail. The division may be effected along the longitudinal element lines depending on the part shape and blank shape. The machining scopes will becomes, as a result, like those shown as (1) through (8) in FIG. 7.

Figure 8A:
FIGS. 8A through 8J are views showing an example of the machining pattern menu for the inside of a recessed shape, respectively.
Figure 8B:
Figure 8C:
Figure 8D:
Figure 8E:
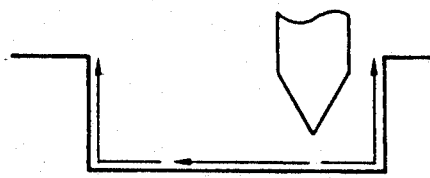
Figure 8F:
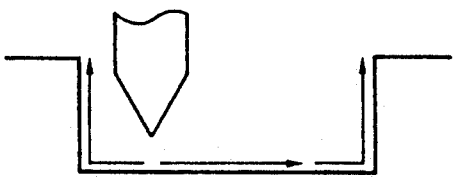
Figure 8G:
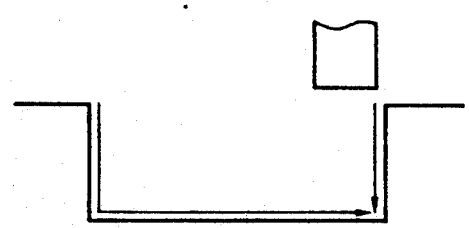
Figure 8H:
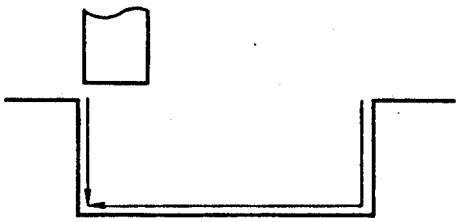
Figure 8I:
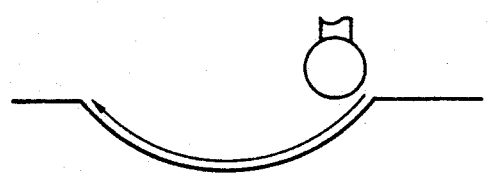
Figure 8J:
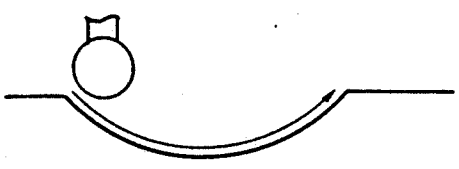
Figure 9A:
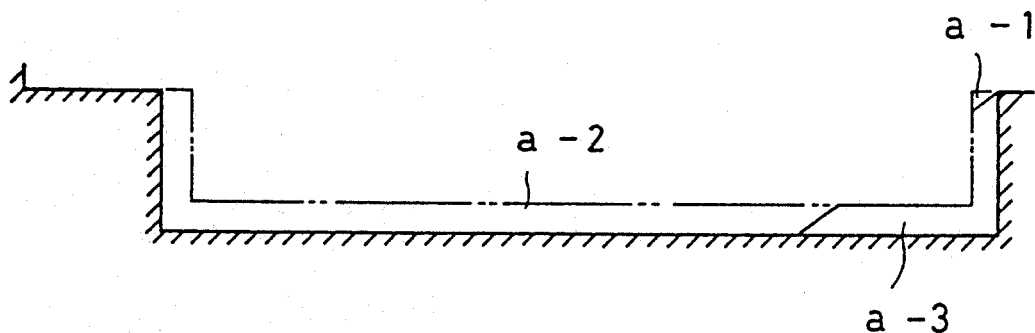
FIGS. 9A through 9D are views showing examples of rough machining region dividing the inside of a recessed shape.
Figure 9C:
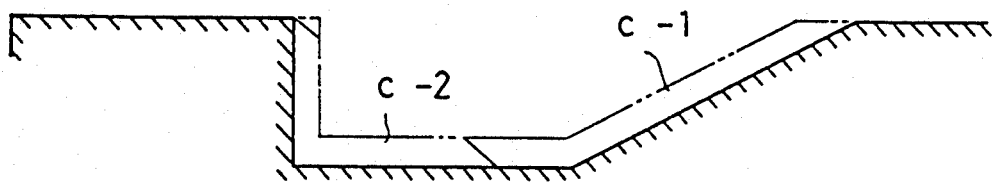
Figure 9B:
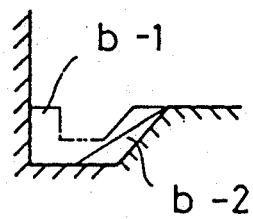
Figure 9D:
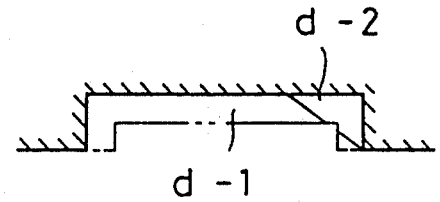

Following the rough machining, in accordance with a recessed shape pattern decision command RC from the step decision control section 14, a finish machining pattern within the recessed shape is automatically decided by the decision section 16 (Step S9). In other words, a method to machine the part defined with the boundaries A through D of FIG. 4 is automatically selected from the menu shown in FIGS. 8A through 8J. In this case, FIG. 8C of the menu is selected for the forward direction and FIG. 8D for the backward direction. When marked with the codes (a) through (d), the machining scopes within each recessed shape will become as shown in FIGS. 9A through 9D.

Figure 10:
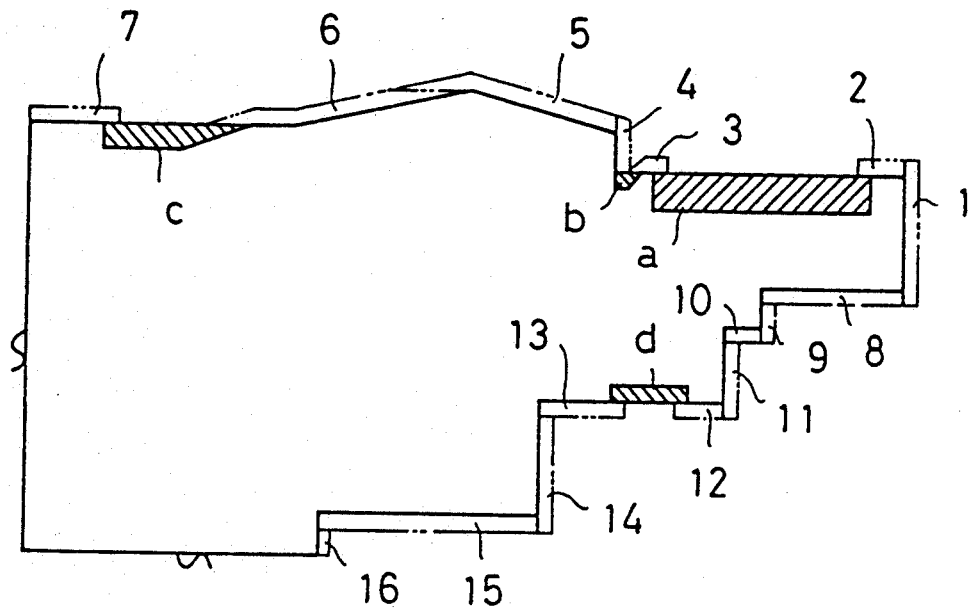
FIG. 10 is a view showing an example of rough machining region dividing the outside of a recessed shape according to the primary rule.

Then, finish machining scopes outside the recessed shape will automatically be decided. As in the rough machining, the machining region is divided by the machining region dividing section 17 based on the machining region dividing command WC according to the criteria of the forward/backward directions, the outer/inner diameters (Steps S10 and S11). The region so far divided is divided along the face element lines by the machining region dividing section 17 based on the machining region dividing command WC in a manner similar to the rough machining (Step S12). As machining regions exist along each of the face part shape element lines and the longitudinal part shape element lines when a longitudinal element line comes adjacent to a face element line forming an angle of 180 degrees or less with respect to the side of the blank shape element lines, it becomes necessary to divide the machining regions on the side of face as well as the longitudinal element lines. Based on the machining region dividing command WC, the machining region dividing section 17 divides the region by extending the longitudinal shape element line to the part shape element line (Step S13). The machining scopes when divided, become as shown at (1) through (16) in FIG. 10. For each of the divided machining scopes, the step type/tool decision section 18 decides the step types and the tools to be used (Step S14). If the ratio of the length against the width is 3 or more in a scope, it is judged a face element, and if the ratio is less than 3, it is judged longitudinal element. If it is assumed that the tools to be used for rough machining for the shapes other than recessed shapes have a tool angle of 80 degrees and a lip angle of 5 degrees, the tools to be used for finish machining have a tool angle of 55 degrees and a lip angle of 17.5 degrees, the tools to be used for rough and finish machinings within the recessed shape have a tool angle of 55 degrees and a lip angle of 3 degrees, then the types of steps and tools to be used for the machining scopes in FIGS. 6, 7, 8 and 10 will become as shown below:

|  | tool angle | lip angle |
|---|---|---|
| FIG. NOS. 6A–6D | | |
| (a)-1 Rough machining/Forward direction/Outer diameter/Longitudinal element | 55 | 3 |
| (a)-2 Rough machining/Backward direction/Outer diameter/Longitudinal element | 55 | 3 |
| (b)-1 Rough machining/Forward direction/Outer diameter/Longitudinal element | 55 | 3 |
| (b)-2 Rough machining/Backward direction/Outer diameter/Longitudinal element | 55 | 3 |
| (c)-1 Rough machining/Backward direction/Outer diameter/Longitudinal element | 55 | 3 |
| (c)-2 Rough machining/Forward direction/Outer diameter/Longitudinal element | 55 | 3 |
| (d)-1 Rough machining/Forward direction/Inner diameter/Longitudinal element | 55 | 3 |
| (d)-2 Rough machining/Backward direction/Inner diameter/Longitudinal element | 55 | 3 |
| FIG. NO. 7 | | |
| (1) Rough machining/Forward direction/Outer diameter/Face element | 80 | 5 |
| (2) Rough machining/Forward direction/Outer diameter/Longitudinal element | 80 | 5 |
| (3) Rough machining/Forward direction/Outer diameter/Longitudinal element | 80 | 5 |
| (4) Rough machining/Backward direction/Outer diameter/Longitudinal element | 80 | 5 |
| (5) Rough machining/Forward direction/Inner diameter/Longitudinal element | 80 | 5 |
| (6) Rough machining/Forward direction/Inner diameter/Face element | 80 | 5 |
| (7) Rough machining/Forward direction/Inner diameter/Longitudinal element | 80 | 5 |
| (8) Rough machining/Forward direction/Inner diameter/Longitudinal element | 80 | 5 |

-continued

|  | tool angle | lip angle |
|---|---|---|
| FIG. NOS. 9A-9D | | |
| ⓐ-1 Finish machining/Forward direction/Outer diameter/Longitudinal element | 55 | 3 |
| ⓐ-2 Finish machining/Forward direction/Outer diameter/Longitudinal element | 55 | 3 |
| ⓐ-3 Finish machining/Backward direction/Outer diameter/Longitudinal element | 55 | 3 |
| ⓑ-1 Finish machining/Forward direction/Outer diameter/Longitudinal element | 55 | 3 |
| ⓑ-2 Finish machining/Backward direction/Outer diameter/Longitudinal element | 55 | 3 |
| ⓒ-1 Finish machining/Backward direction/Outer diameter/Longitudinal element | 55 | 3 |
| ⓒ-2 Finish machining/Forward direction/Outer diameter/Longitudinal element | 55 | 3 |
| ⓓ-1 Finish machining/Forward direction/Inner diameter/Longitudinal element | 55 | 3 |
| ⓓ-2 Finish machining/Backward direction/Inner diameter/Longitudinal element | 55 | 3 |
| FIG. NO. 10 | | |
| ① Finish machining/Forward direction/Outer diameter/Face element | 55 | 17.5 |
| ② Finish machining/Forward direction/Outer diameter/Longitudinal element | 55 | 17.5 |
| ③ Finish machining/Forward direction/Outer diameter/Longitudinal element | 55 | 17.5 |
| ④ Finish machining/Forward direction/Outer diameter/Face element | 55 | 17.5 |
| ⑤ Finish machining/Forward direction/Outer diameter/Longitudinal element | 55 | 17.5 |
| ⑥ Finish machining/Backward direction/Outer diameter/Longitudinal element | 55 | 17.5 |
| ⑦ Finish machining/Backward direction/Outer diameter/Longitudinal element | 55 | 17.5 |
| ⑧ Finish machining/Forward direction/Inner diameter/Longitudinal element | 55 | 17.5 |
| ⑨ Finish machining/Forward direction/Inner diameter/Longitudinal element | 55 | 17.5 |
| ⑩ Finish machining/Forward direction/Inner diameter/Longitudinal element | 55 | 17.5 |
| ⑪ Finish machining/Forward direction/Inner diameter/Face element | 55 | 17.5 |
| ⑫ Finish machining/Forward direction/Inner diameter/Longitudinal element | 55 | 17.5 |
| ⑬ Finish machining/Forward direction/Inner diameter/Longitudinal element | 55 | 17.5 |
| ⑭ Finish machining/Forward direction/Inner diameter/Face element | 55 | 17.5 |
| ⑮ Finish machining/Forward direction/Inner diameter/Longitudinal element | 55 | 17.5 |
| ⑯ Finish machining/Forward direction/Inner diameter/Longitudinal element | 55 | 17.5 |

The process steps determined as above are registered at the machining registering section 19, and an operator while watching the results, inputs commands for revisions of those steps via the step revision command section 10. All the revision commands for the Steps S15 through S25 in FIG. 2B are executed by the step revision command section 10.

Figure 2A:
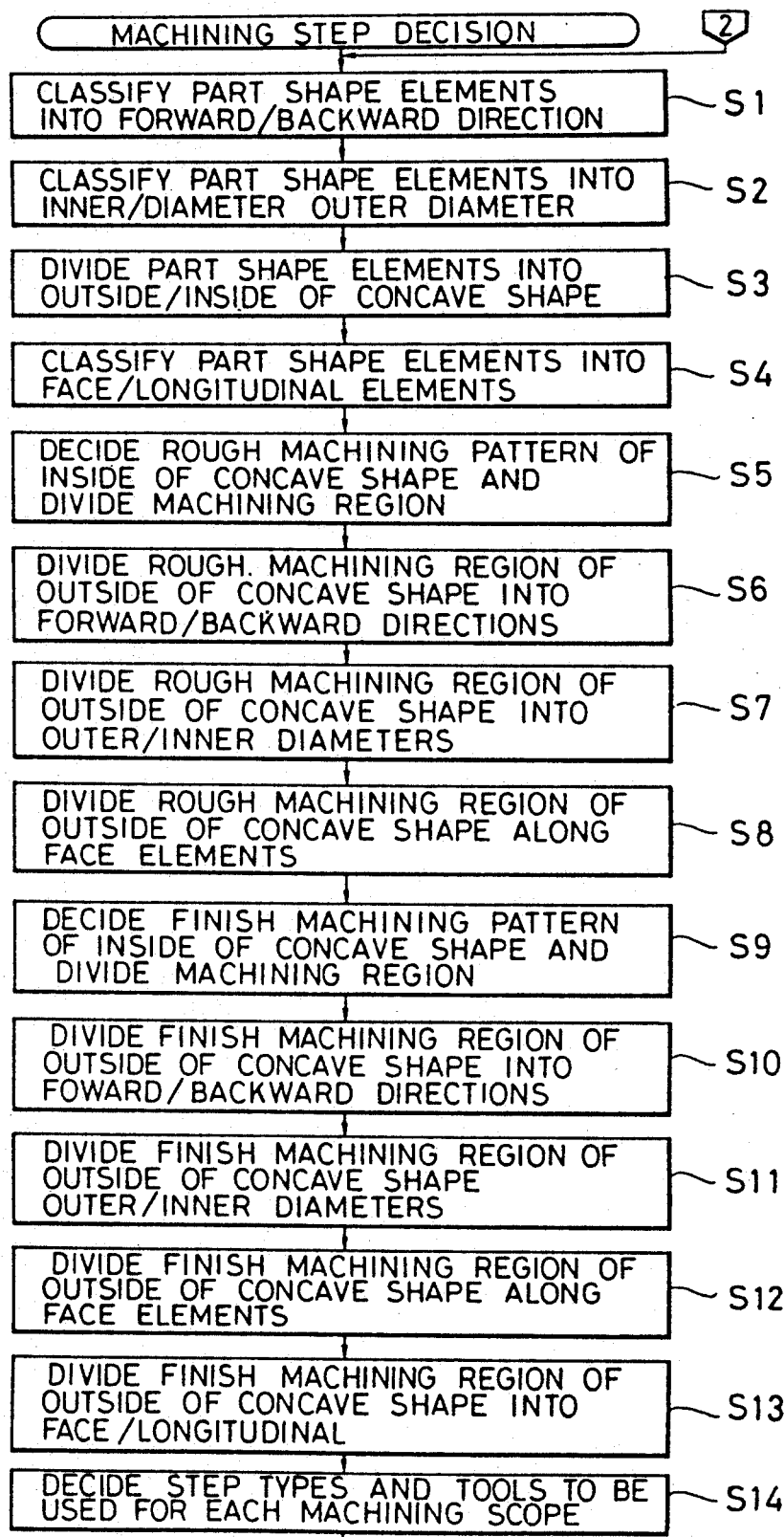
FIGS. 2A and 2B are flow charts showing examples of the operation thereof.
Figure 2B:
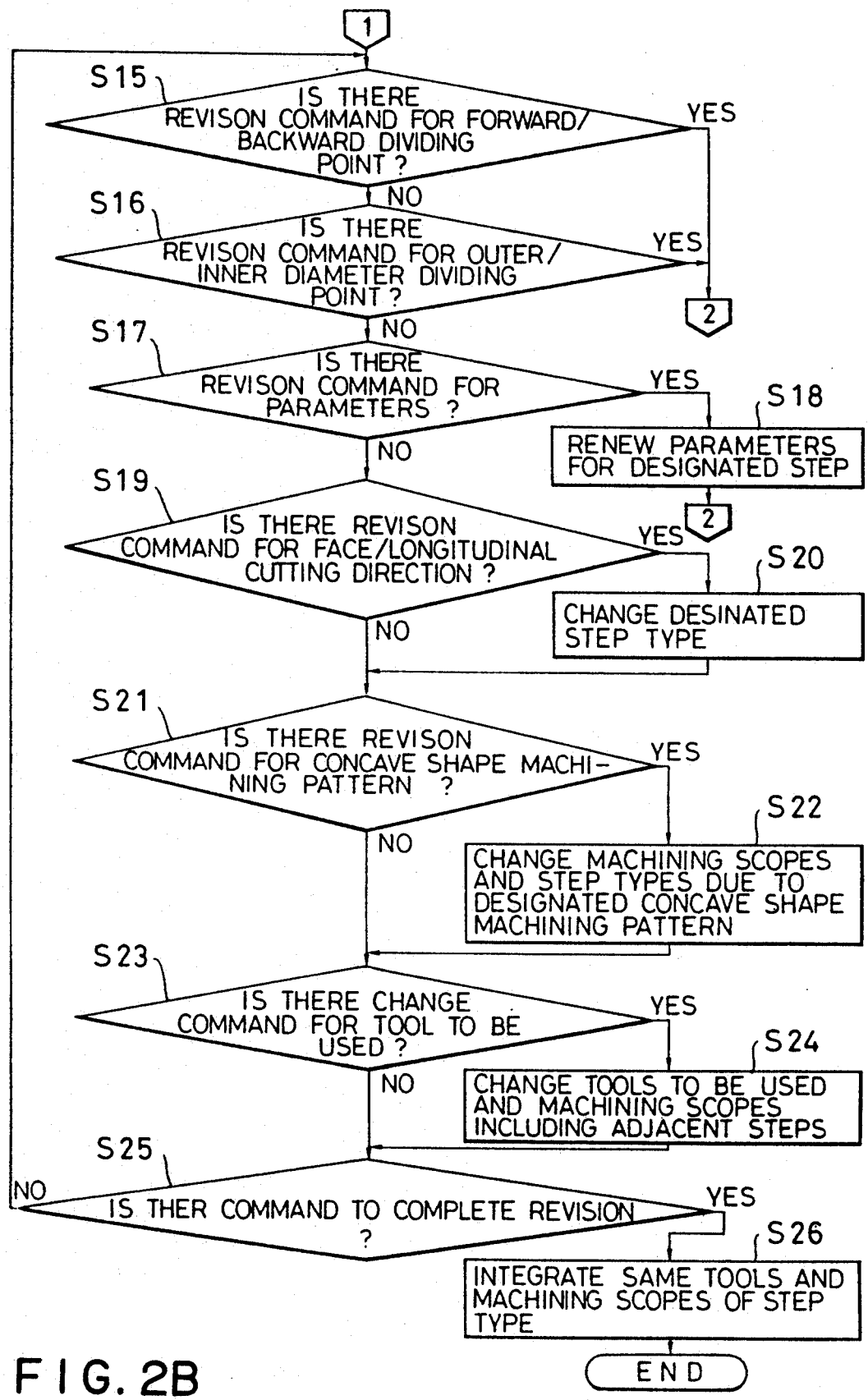
Figure 11:
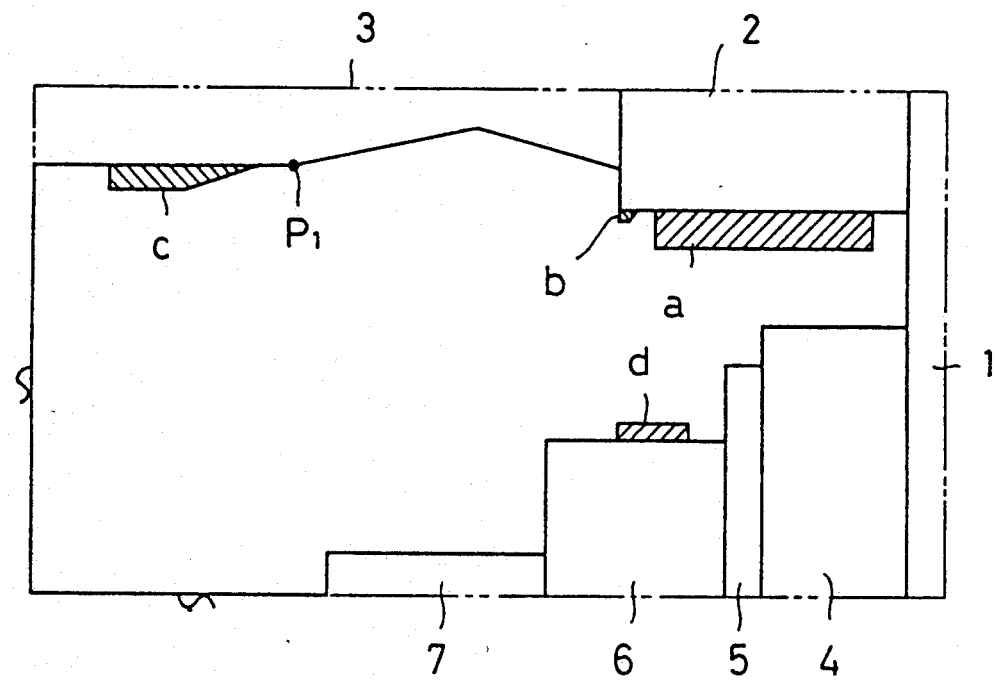
FIG. 11 is a view showing an example of rough machining region dividing the outside of a recessed shape when the dividing point for backward/forward direction has been modified.
Figure 12A:
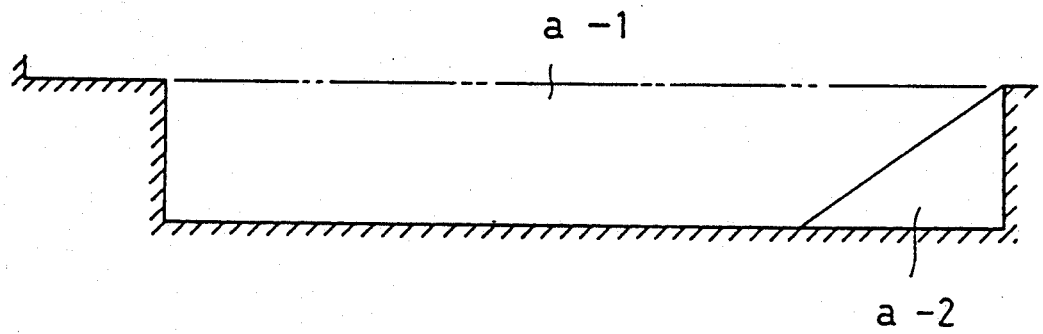
FIGS. 12A through 12D are views showing examples of dividing rough machining regions inside a recessed shape when the machining pattern has been changed, respectively.
Figure 12C:
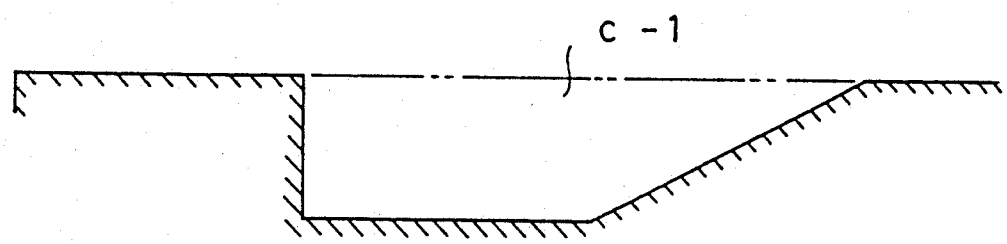
Figure 12B:
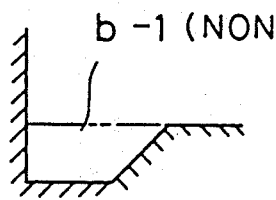
Figure 12D:
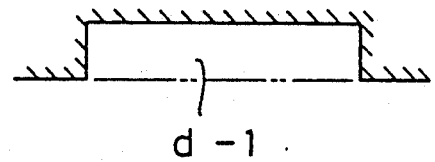

First, it is determined whether or not there is a revision command for the forward/backward dividing point (Step S15), and if there is one, the procedure returns to the Step S1 in FIG. 2A so as to generate all the steps again starting from the designated forward-/backward dividing point, but if there is none, the process proceeds to the Step S16. At the Step S16, it is determined whether or not there is a revision command for the outer/inner diameter dividing point and if there is one, the step is returned to the Step S1 so as to generate again all the steps starting from the designated dividing point, but if there is none, step proceeds to the Step S17. It is assumed here in this case that the forward-/backward direction dividing point (on the outer diameter side) P1 in FIG. 11 is to be revised to the one shown in FIG. 13. Then, the machining scopes for both the rough and finish machining other than the recessed shape will become those indicated in FIG. 11 at ① to ⑦ for the rough machining and those indicated at ① to ⑮ in FIG. 13 for the finish machining. A step ③ in FIG. 11 and a step ⑤ in FIG. 13 will become as shown below;

|  | tool angle | lip angle |
|---|---|---|
| FIG. NO. 11 | | |
| ③ Rough machining/Forward direction/Outer diameter/Longitudinal element | 80 | 5 |
| FIG. NO. 13 | | |
| ⑤ Finish machining/Forward direction/Outer diameter/Longitudinal element | 55 | 17.5 |

At the Step S17, it is determined whether or not a revision command for parameters exists, and if there is such command, the parameters are renewed for the designated process alone (Step S18), and the step returns to the Step S1. If there is no such revision command, the procedure proceeds to the Step S19. It is assumed that the ratio of the length against the width of the machining scope for the one which is judged as a face element in finishing changes from more than 3 to more than 7. Then, although the machining scopes at ①, ④, ⑨ and ⑬ in FIG. 13 were judged faces, only the steps ① and ⑬ a are judged now as faces.

Then, it is determined whether or not there is a revision command for the face/longitudinal element and cutting direction (Step S19), and if there is one, the designated step type among the commands registered in the machining step registering section 19 are changed (Step S20), but if there is no such command, the procedure proceeds to the subsequent Step S21. In this case, the step 5 in FIG. 11 is revised from the one for the face element to that for a longitudinal element and the step 6 in FIG. 13 from the one for the backward direction to that for the forward direction.

|  | tool angle | lip angle |
|---|---|---|
| FIG. NO. 11 | | |
| ⑤ Rough machining/Forward direction/Inner diameter/Face element | 80 | 5 |

↓

|  | tool angle | lip angle |
|---|---|---|
| ⑤ Rough machining/Forward direction/Inner diameter/Longitudinal element FIG. NO. 13 | 80 | 5 |
| ⑥ Finish machining/Backward direction/Outer diameter/Longitudinal element ↓ | 55 | 17.5 |
| ⑥ Finish machining/Forward direction/Outer diameter/Longitudinal element | 55 | 17.5 |

Figure 13:
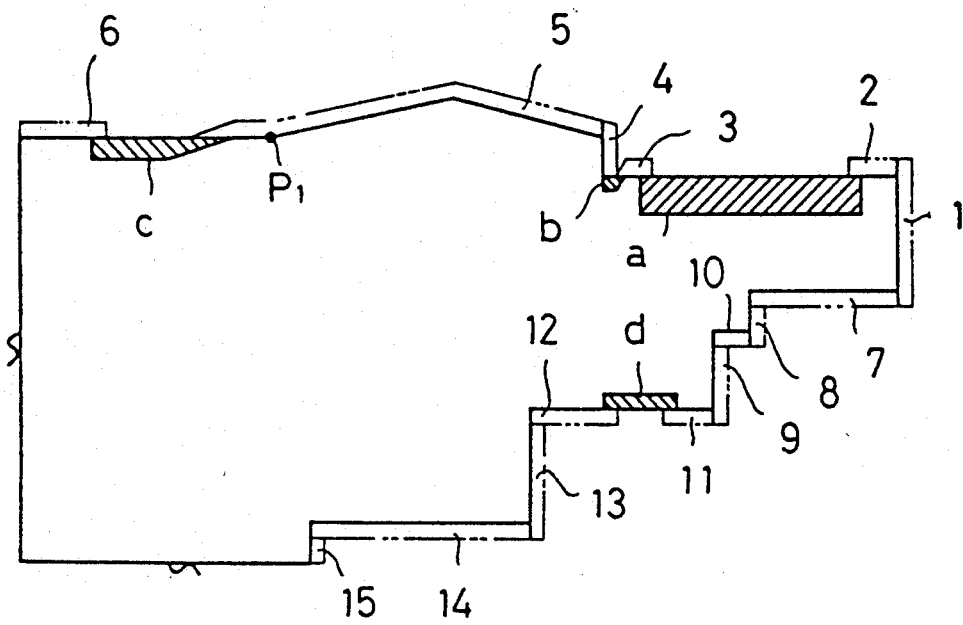
FIG. 13 is a view showing an example of dividing finish machining regions of a recessed shape when the forward/backward dividing point has been modified.
Figure 14A:
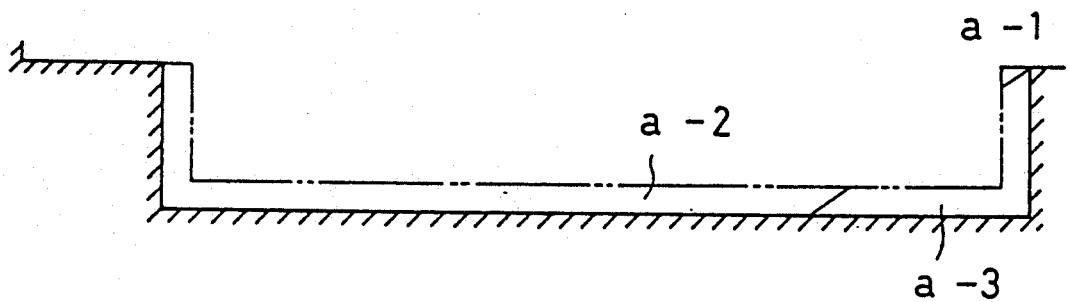
FIGS. 14A through 14D are views showing examples of dividing finishing machining regions inside a recessed shape when the machining pattern inside a recessed shape has been modified, respectively.
Figure 14C:
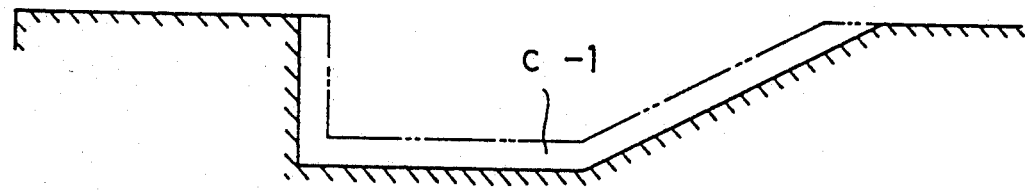
Figure 14B:
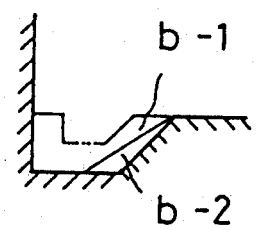
Figure 14D:
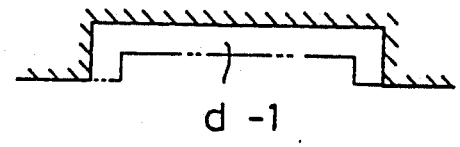
Figure 15A:
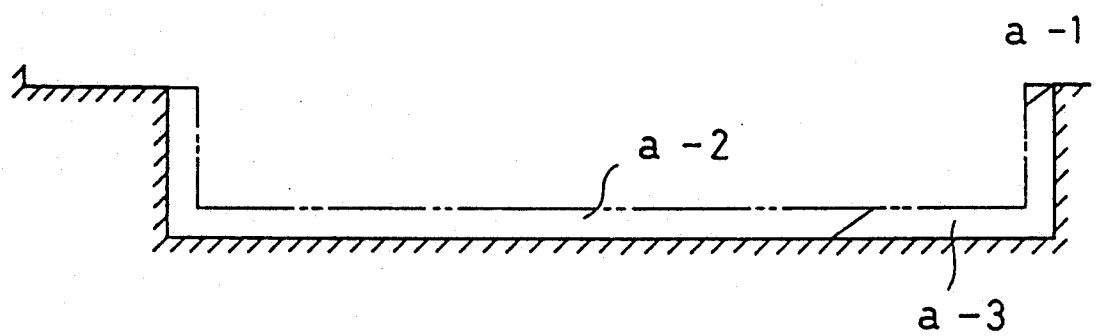
FIGS. 15A through 15D are views showing dividing finishing machining regions inside a recessed shape when the tools have been modified for the inside of the recessed shape, respectively.
Figure 15C:
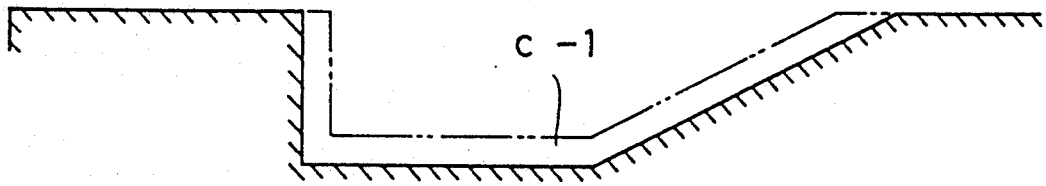
Figure 15B:
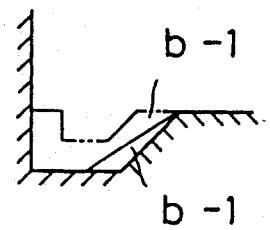
Figure 15D:
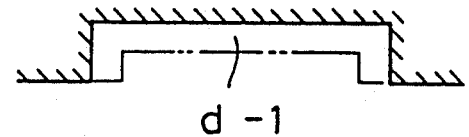

Then, it is determined whether or not there is a revision command for the recessed shape machining pattern (Step S21), and if there is any, the machining pattern of the designated recessed shape out of those registered at the machining step registering section 19 is changed, and related machining scopes and step types are changed (Step S22). If there is no such revision command, the procedure will proceed to the Step S23. In this case, the machining pattern ⓐ for the concave shape shown in FIG. 11 is changed from that shown in FIG. 5C into non-machining, the machining pattern ⓒ of the concave shape is changed from FIG. 5D to FIG. 5C, and the machining pattern ⓓ for the concave shape is changed from FIG. 5C to FIG. 5J (groove machining). The machining pattern ⓒ of the concave shape in FIG. 13 is changed from FIG. 8D to FIG. 8C, the machining pattern ⓓ of the concave shape is changed from FIG. 5C to FIG. 5H or to the groove machining. More specifically, the machining scopes will be modified as shown in FIGS. 12A through 12D and FIGS. 14A through 14D. Correspondingly, the step types will be changed as shown below.

changed (Step S24). If there is no such command, the procedure proceeds to the Step S25. In this case, in order to minimize the number of tools for rough machining in and out of the concave shape on the outer diameter, the tool for the steps ② and ③ in FIG. 11 is changed to one having a tool angle of 55 degrees and a lip angle of 3 degrees. Also to minimize the number of tools, the tools to be used for the forward direction machining shown at the steps ② to ⑥ in FIG. 13 and at the steps ⓐ to ⓒ are changed those having a tool angle of 35 degrees and a lip angle of 3 degrees. As a result, the machining scopes within the concave shape will be changed to those shown in FIGS. 15A and 15B. This change is advantageous as the step in the backward direction is no longer necessary for FIG. 15B. Further, it is determined whether or not there is a command to complete change (Step S25), and if there is such change completion command, the machining scopes involving the same tool and the same step type out of those stored in the machining step registering section 19 are integrated at the machining step integrating section 20 (Step S26), to deem them as one step. If there is no revision

|  | tool angle | lip angle |
|---|---|---|
| FIG. NOS. 12A-12D |  |  |
| ⓐ-1 Rough machining/Forward direction/Outer diameter/Longitudinal element | 55 | 3 |
| ⓐ-2 Rough machining/Backward direction/Outer diameter/Longitudinal element | 55 | 3 |
| ⓑ-1 Non-machining |  |  |
| ⓒ-1 Rough machining/Forward direction/Outer diameter/Longitudinal element | 55 | 3 |
| ⓓ-1 Rough grooving/Forward direction/Inner diameter/ ↑ |  |  |
| FIG. NOS. 14-14D |  |  |
| ⓐ-1 Finish machining/Forward direction/Outer diameter/Longitudinal element | 55 | 3 |
| ⓐ-2 Finish machining/Forward direction/Outer diameter/Longitudinal element | 55 | 3 |
| ⓐ-3 Finish machining/Backward direction/Outer diameter/Longitudinal element | 55 | 3 |
| ⓑ-1 Finish machining/Forward direction/Outer diameter/Longitudinal element | 55 | 3 |
| ⓑ-2 Finish machining/Backward direction/Outer diameter/Longitudinal element | 55 | 3 |
| ⓒ-1 Finish machining/Forward direction/Outer diameter/Longitudinal element | 55 | 3 |
| ⓓ-1 Finish grooving/Forward direction/Inner diameter/ ↑ |  |  |

Figure 16:
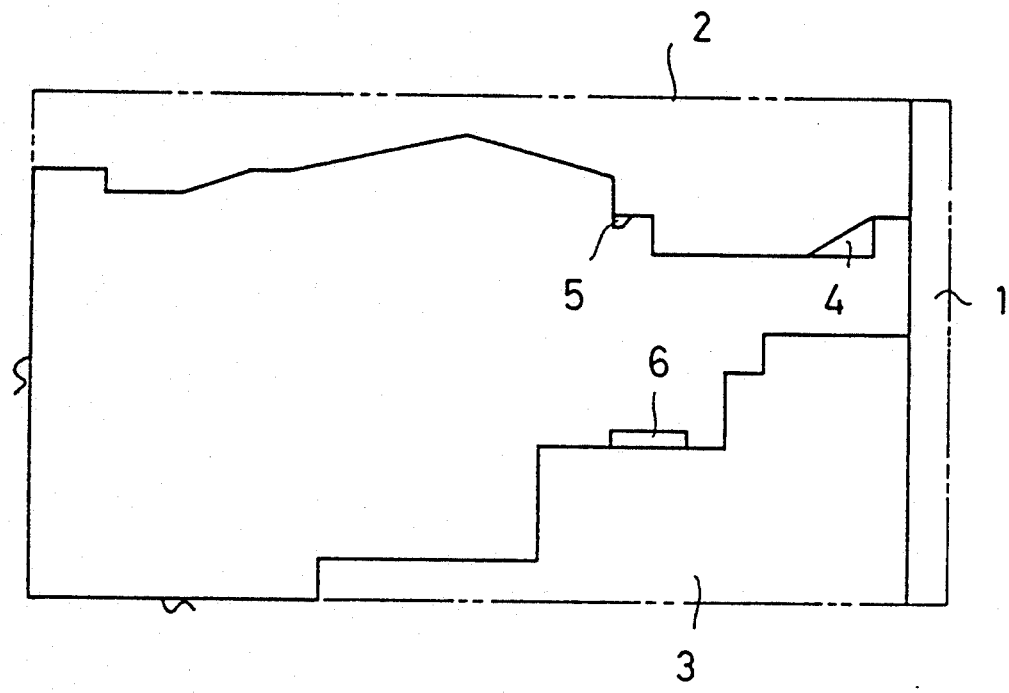
FIG. 16 is a view showing an example of rough machining region according to the secondary rule.
Figure 17:
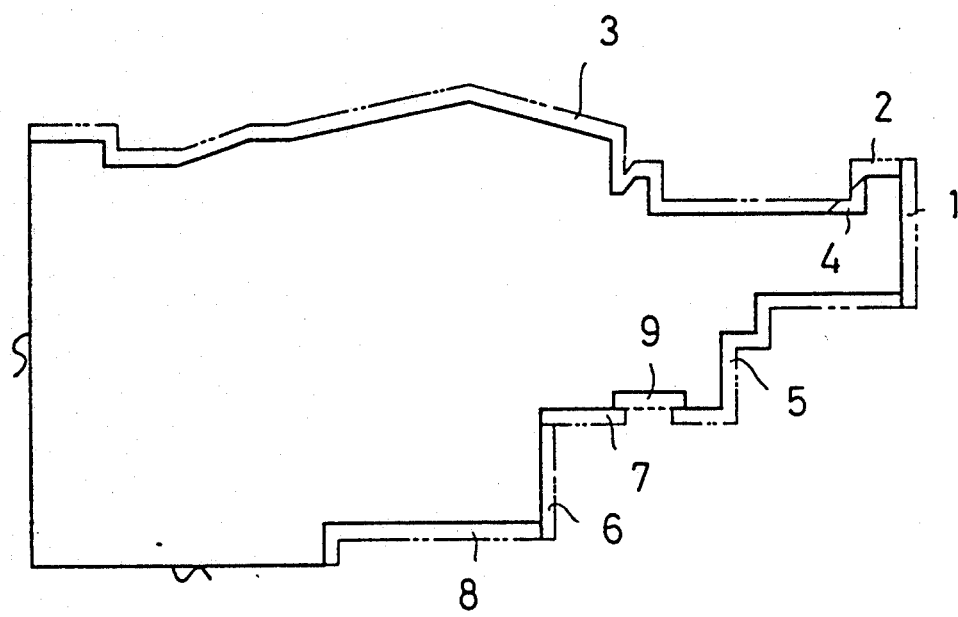
FIG. 17 is a view showing an example of finishing machining region according to the primary rule.

Then, it is determined whether or not there is a command to make a change in tools to be used (Step S23), and if there is any, tools scheduled in the designated steps out of the steps registered in the machining step registering section 19 are changed, and the machining scopes at the designated step and at adjacent steps are command, the procedure returns to the Step S15. As a result of integration, the machining scopes will become as shown in FIG. 16 for the rough machining and as in FIG. 17 for the finish machining. The step types and tools to be used will become as follows.

|  | tool angle | lip angle |
|---|---|---|
| FIG. NO. 16 |  |  |
| ① Rough machining/Forward direction/Outer diameter/Face element | 80 | 5 |
| ② Rough machining/Forward direction/Outer diameter/Longitudinal element | 55 | 3 |
| ③ Rough machining/Forward direction/Inner diameter/Longitudinal element | 80 | 5 |
| ④ Rough machining/Backward direction/Outer diameter/Longitudinal element | 55 | 3 |
| ⑤ Non-machining |  |  |
| ⑥ Rough grooving/Forward direction/Inner diameter/ ↑ |  |  |
| FIG. NO. 17 |  |  |
| ① Finish machining/Forward direction/Outer diameter/Face element | 55 | 17.5 |
| ② Finish machining/Forward direction/Outer diameter/Longitudinal element | 35 | 3 |
| ③ Finish machining/Forward direction/Outer diameter/Longitudinal element | 35 | 3 |
| ④ Finish machining/Backward direction/Outer diameter/Longitudinal element | 55 | 3 |

-continued

| | tool angle | lip angle |
|---|---|---|
| ⑤ Finish machining/Forward direction/Inner diameter/Longitudinal element | 55 | 17.5 |
| ⑥ Finish machining/Forward direction/Inner diameter/Face element | 55 | 17.5 |
| ⑦ Finish machining/Forward direction/Inner diameter/Longitudinal element | 55 | 17.5 |
| ⑧ Finish machining/Forward direction/Inner diameter/Longitudinal element | 55 | 17.5 |
| ⑨ Finish grooving/Forward direction/Inner diameter/ ↑ | | |

The information on the steps integrated by the machining step integrating section 20 is transmitted to a numerical control information generating section 21 to generate numerical control information, which in turn is outputted to a numerical control system.

According to this invention, based on the step types, tools to be used and machining scopes automatically selected based on a certain rule, an operator can modify any of those input step types, tools and machining scopes if necessary, by a simple input method. Therefore, the part shapes and blank shapes have been inputted, without the need to pay any particular attention to detailed data on the shapes, this system permits an operator to utilize his/her knowhow to the fullest extent.

It should be understood that many modifications and adaptations of the invention will become apparent to those skilled in the art and it is intended to encompass such obvious modifications and changes in the scope of the claims appended hereto.

What is claimed is:

1. An apparatus for determining machining steps in a numerical control information generating device which receives input shape data denoting the shape of a blank to be machined and the shape of a machined part and which generates numerical control information for a machining process based on the input shape data, said apparatus comprising:

automatic decision means for receiving the input shape data and for automatically determining types of machining steps, tools to be used and machining scopes of the machining process based on the input shape data and primary rules, the primary rules defining criteria used to automatically determine the types of machining steps, tools to be used and machining scopes of the machining process from the input shape data, the criteria including a rule for dividing a machining region of the blank shape according to a line segment extending in a negative Z-axis direction from a division point between forward and backward machining directions, and further dividing the machining region of the blank shape by a line segment extending parallel to an X-axis from a division point between inner diameter and outer diameter machining away from the machined part shape, and further dividing the machining region of the blank shape by either a line segment extending from a point having a minimum value in the X-axis direction of the inner diameter from among face element lines of element lines defining the machined part shape and the maximum value in the X-axis direction of the outer diameter to a line segment which divides the blank shape in parallel to the X-axis direction or the forward and backward directions, or a line segment extending from a point having a maximum value in the Z-axis direction of the forward direction and a minimum value in the Z-axis direction of the backward direction of longitudinal line elements of the line elements defining the machined part shape, and a rule for specifying face machining when a ratio of a maximum width in the X-axis direction to a maximum width in the Z-axis direction of a machining scope obtained by said dividing of the machining region is more than a predetermined value, and for specifying longitudinal machining if the ratio is less than the predetermined value;

designation means for receiving operator commands and for designating types of machining steps, tools to be used and machining scopes automatically determined by said automatic decision means as identified in the operator commands which an operator has selected for revision;

extraction means for extracting the types of machining steps, tools to be used and machining scopes designated by said designation means; and automatic revision means for automatically revising the types of machining steps, tools to be used and machining scopes extracted by said extraction means according to secondary rules which the operator prefers over the primary rules.

2. An apparatus for determining machining steps in a numerical control information generating device which receives input shape data denoting the shape of a blank to be machined and the shape of a machined part and which generates numerical control information for a machining process based on the input shape data, said apparatus comprising:

automatic decision means for receiving the input shape data and for automatically determining types of machining steps, tools to be used and machining scopes of the machining process based on the input shape data and primary rules, the primary rules defining criteria used to automatically determine the types of machining steps, tools to be used and machining scopes of the machining process from the input shape data, the criteria including a rule for dividing a machining region of the blank shape according to a line segment extending in a negative Z-axis direction from a division point between forward and backward machining directions, and further dividing the machining region of the blank shape by a line segment extending parallel to an X-axis from a division point between inner diameter and outer diameter machining away from the machined part shape, and further dividing the machining region of the blank shape by either a line segment extending from a point having a minimum value in the X-axis direction of the inner diameter from among face element lines of element lines defining the machined part shape and a maximum value in the X-axis direction of the outer diameter to a line segment which divides the blank shape in parallel to the X-axis direction or the forward and backward directions, or a line segment extending from a point having a maximum value in the Z-axis direction of the forward direction and a minimum value in the Z-axis direction of the backward direction of longitudinal element lines of the element lines defining the machined part shape to a line segment which divides the blank shape in parallel to the X-axis direction or between the inner and outer diameters, and if a face element line exists which forms an angle of less than 180 degrees with a side of the blank shape element lines of the machined part shape adjacent to a longitudinal element line, for dividing the machining region of the blank shape into a face element region and a longitudinal element region, and a rule for specifying face machining when a ratio of a maximum width in the X-axis direction to a maximum width in the Z-axis direction of a machining scope obtained by said dividing of the machining region is more than a predetermined value, and for specifying longitudinal machining if the ratio is less than the predetermined value;

designation means for receiving operator commands and for designating types of machining steps, tools to be used and machining scopes automatically determined by said automatic decision means as identified in the operator commands which an operator has selected for revision;

extraction means for extracting the types of machining steps, tools to be used and machining scopes designated by said designation means; and automatic revision means for automatically revising the types of machining steps, tools to be used and machining scopes extracted by said extraction means according to secondary rules which the operator prefers over the primary rules.

3. An apparatus as recited in claim 2, wherein, when the forward and backward direction division point and the inner and outer diameter division point are designated by said designation means, said automatic decision means automatically revises the types of machining steps and machining scopes according to a revised forward and backward direction division point and a revised inner and outer diameter division point.

4. An apparatus as recited in claim 2, wherein, when the face and longitudinal regions and machining directions are designated by said designation means for revision according to the secondary rules, said automatic decision means automatically revises the types of machining steps according to the revised face and longitudinal regions and machining directions.

5. An apparatus as recited in claim 2, wherein, when the machining pattern within a concave region is designated by said designation means for revision according to the secondary rules, said automatic decision means automatically revises the types of machining steps and machining scope according to the revised machining pattern within the concave region.

6. An apparatus as recited in claim 2, wherein, when the tools to be used are designated by said designation means for revision according to the secondary rules, said automatic decision means automatically revises the types of machining steps and machining scope according to the revised tools to be used.

7. An apparatus as recited in claim 2, wherein, when the parameters relating to the automatic decision of types of machining steps and machining scopes of a given part of the machining process are designated by said designation means for revision according to the secondary rules, said automatic decision means automatically revises only the corresponding parameters relative to the given part of the machining process.

8. An apparatus as recited in claim 2, wherein, when plural machining scopes exist adjacent to one another and are to be machined by same machining steps using the same tools, said revision means integrates the plural machining scopes as a single machining step.

* * * * *